Sept. 23, 1924.

V. F. MIKOLASEK

HEADLIGHT

Filed April 1, 1920

1,509,682

Inventor

V. F. Mikolasek,

By G. Hume Talbert

Attorney

Patented Sept. 23, 1924.

1,509,682

UNITED STATES PATENT OFFICE.

VENCESLAUS F. MIKOLASEK, OF LANKIN, NORTH DAKOTA.

HEADLIGHT.

Application filed April 1, 1920. Serial No. 370,490.

*To all whom it may concern:*

Be it known that VENCESLAUS F. MIKOLASEK, citizen of United States of America, residing at Lankin, in the county of Walsh and State of North Dakota, have invented new and useful Improvements in Headlights, of which the following is a specification.

The present invention has for its purpose to provide, in a headlight, a casing with a lens, in conjunction with a lighting unit suspended in the casing for universal swinging movement and provided with a rearwardly extending member carrying adjustable counterbalancing means whereby, when the casing inclines downwardly and forwardly or upwardly and forwardly, the lighting unit balances perpendicularly so as to direct the light rays downwardly or upwardly according to the inequalities in the roadway.

Figure 2:
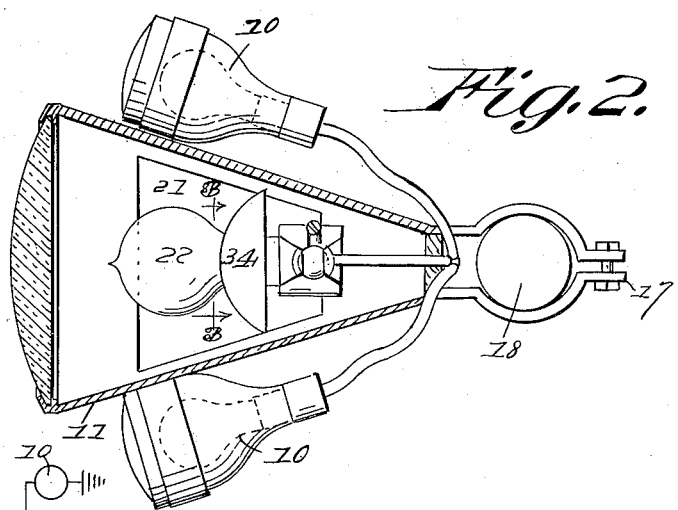
Figure 2 is a horizontal section showing the lamps in plan view.
Figure 4:
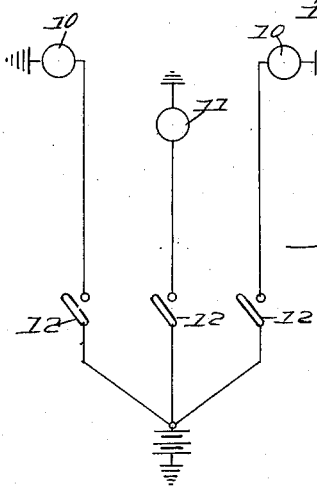
Figure 4 is a diagrammatic view of the circuit connections.

The essential feature of the device resides in the use of angularly directed indicator lamps 10 which in the construction shown in Figure 2 are disposed upon opposite sides of a search light casing 11 arranged in a circuit such as that shown in Figure 4 with suitable switches or buttons located within convenient reach of the driver of the car to the end that either of the direction lights or the search light may be actuated to disclose the intention of the driver as to following a straight forward course or changing his direction of progress either to the right or to the left, it being obvious that the illumination of the right lamp will serve not only to parties in advance but those in the rear of the car to indicate an intention to turn in that direction, the angular disposition of the direction lights making it possible for the driver of a following car to readily see and understand the signal.

Figure 1:
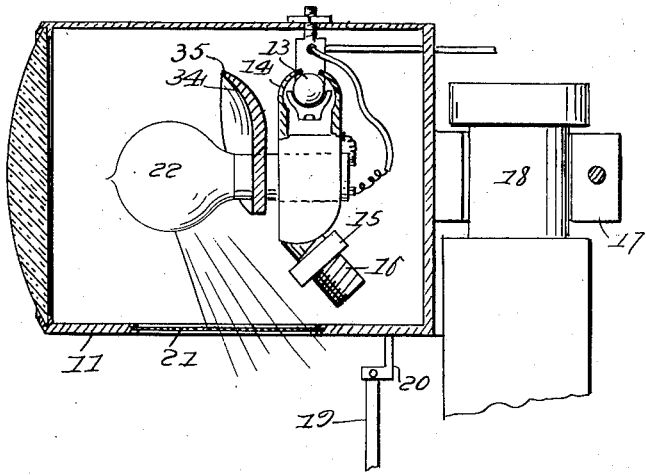
Figure 1 is a sectional view of the lamp showing the search light feature.
Figure 3:
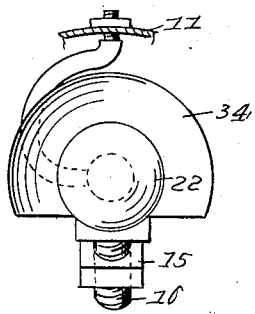
Figure 3 is a detail rear view of the search light lamp which is universally suspended for maintaining a uniform position.

The straight ahead or forwardly directed search light is preferably suspended as indicated in Figure 1 to maintain a uniform position regardless of the inclination of the car upon which it may be mounted, as by providing a universal joint consisting of the ball 13 and socket 14 and a counter-weight 15 adjustably mounted upon a stem 16 to the end that the lamp may be axially inclined either upward or downward or may be disposed in a truly horizontal position according to the preference of the driver.

The casing 11 is preferably provided with a clamp 17 for engagement with the radiator cap 18 and carries a license plate 19 for which purpose it is provided with a depending bracket 20 while in the bottom of the case is inserted a panel 21 to permit rays of light from the lamp 22 to fall upon the license tag.

It is obvious that the direction lamps or one of them may be employed as a parking lamp owing to the fact that its angular location serves to make it visible either from the front or the rear of the machine, and in practice it is preferred to construct the reflector 34 of the search light with an overhanging segmental downwardly directed portion 35 wherein connection with the flat portion thereof the rays of light from the lamp 22 are directed downwardly and forwardly, but are not concentrated in an upward direction such as would tend to interfere with the vision of the driver or the car approaching in the opposite direction.

The invention having been described as being what is new and useful is:

1. A headlight including a stationary forwardly directed casing provided with a lens, a lighting unit suspended in the casing for universal swinging movement and having a rearwardly directed arm carrying an adjustable counterbalancing weight whereby, when the casing inclines downwardly and forwardly or upwardly and forwardly, the weight balances the unit perpendicularly, thereby directing the light rays downwardly or upwardly.

2. In a headlight, the combination with a stationary forwardly directed casing provided with a lens, of a fulcrum contained in said casing, a member suspended upon said fulcrum and provided with a rearwardly directed arm and carrying a forwardly directed lighting unit, and counterbalancing means on said arm to maintain the member perpendicularly suspended from the fulcrum whereby, as the casing is directed downwardly or upwardly according to the inequalities of the roadway, the light rays from the lighting unit may be directed downwardly or upwardly.

In testimony wherof I affix my signature.

VENCESLAUS F. MIKOLAŠEK.